Feb. 5, 1924.
F. R. GOEHNER
COVER FOR TIRES
Filed Feb. 24, 1922
1,482,892
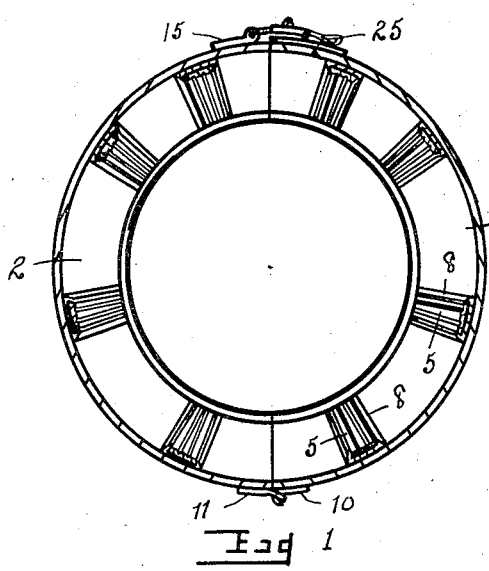
Fig 1
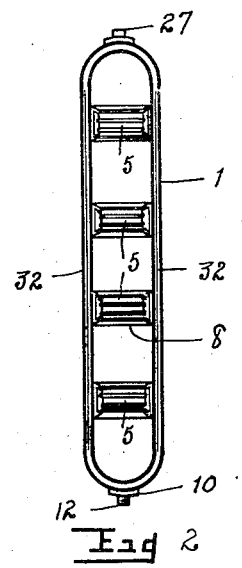
Fig 2
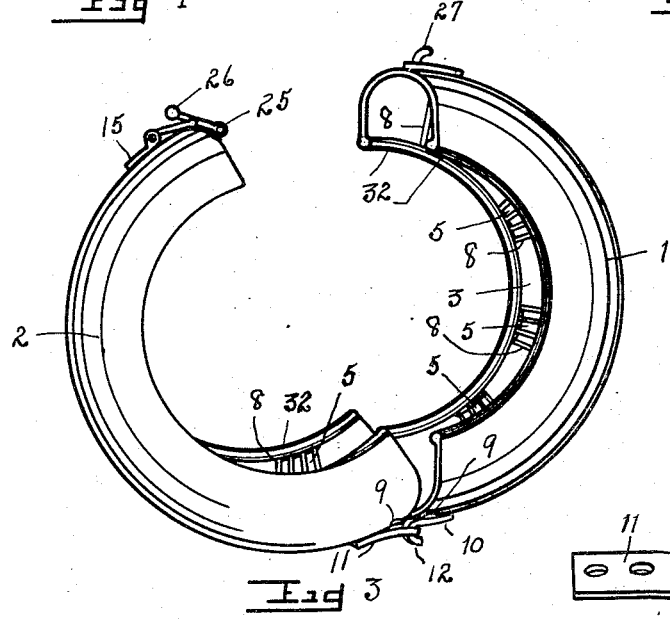
Fig 3
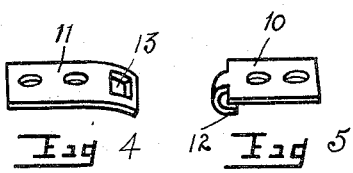
Fig 4   Fig 5
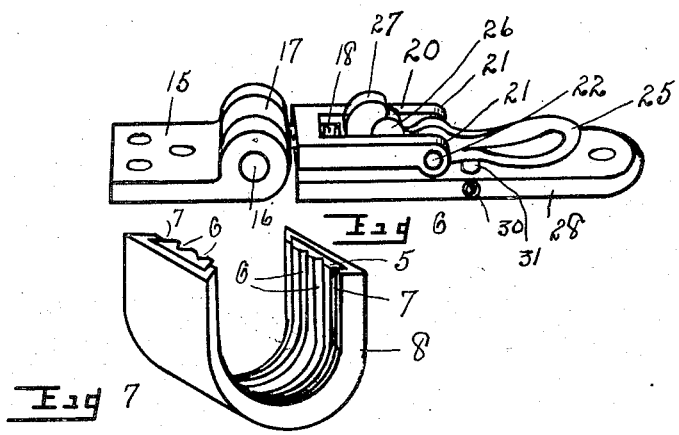
Fig 6
Fig 7
INVENTOR
Frederick R. Goehner
BY
Thomas L. Wilder
ATTORNEY Patented Feb. 5, 1924.

1,482,892

UNITED STATES PATENT OFFICE.

FREDERICK R. GOEHNER, OF UTICA, NEW YORK.

COVER FOR TIRES.

Application filed February 24, 1922. Serial No. 538,937.

*To all whom it may concern:*

Be it known that I, FREDERICK R. GOEHNER, a citizen of the United States, residing at Utica, in the county of Oneida and State of New York, have invented certain new and useful Improvements in Covers for Tires, of which the following is a specification, reference being had therein to the accompanying drawing.

My invention relates to a cover for a tire, and I declare the following to be a full, clear, concise and exact description thereof sufficient to enable anyone skilled in the art to which it appertains to make and use the same reference being had to the accompanying drawings in which like reference characters refer to like parts throughout the specification.

The object of the invention is to provide a cover for carrying an extra pneumatic tire on an automobile. The cover is designed to prevent damage to the tire through collision or through malicious or other willful injury thereto by miscreants or other persons. Moreover, the cover is designed to effect an air space about said tire and within the casing, whereby to prevent the sunlight or other source of heat from rotting the rubber of the tire.

The object will appear by referring to the drawings, in which:

Fig. 1 is a central vertical section of the cover;

Fig. 2 is an elevational view looking into one of the parts of the cover;

Fig. 3 is a perspective view of the cover, showing the parts of the cover disconnected at one end;

Fig. 4 is an enlarged detail view, showing one of the parts of a detachable hinge employed;

Fig. 5 is an enlarged detail view, showing the complemental part of the hinge of Fig. 4;

Fig. 6 is an enlarged detail view of a locking device employed;

Fig. 7 is an enlarged detail view of a piece of felt used, showing the same incased in a metal frame that is soldered to the inside of the casing of the cover.

Referring more particularly to the drawings, the device embodies two semi-circular parts 1 and 2, which are made preferably of metal, such as aluminum or sheet steel. Furthermore, each of said parts 1 and 2 is made in the shape of a U in cross section, whereby to leave an open space 3 for assembling the cover about an extra tire carried on a demountable rim that is held to the chassis or back part of an automobile in any well known manner, although not here shown.

Pieces of felt 5 or other suitable fabric are disposed at given intervals on the inside of each of the parts 1 and 2 and extend from edge to edge thereof, whereby to furnish rests for holding the tire away from the interior surface of the metal cover and, thereby, effect an air chamber for the circulation of air between the inner surface of the cover and the exterior surface of the tire, not shown. This air space will tend to preserve the tire by preventing the heat from rotting the rubber thereof.

Each of said pieces of felt 5 is made with V shaped grooves 6 therein, which grooves 6 are adapted for the circulation of air. Moreover, each of the pieces of felt 5 are tapered as at 7, 7 along the outer edges thereof, whereby to fit within the metal casings 8 and to be held in place thereby. Said metal casings 8 are soldered to the inner surface of the parts 1 and 2.

A hole 9 is made in each of the parts 1 and 2, whereby to allow any water that has accidentally entered the interior of the casing to escape thereout.

The mechanism for holding together parts 1 and 2 in a demountable manner, embodies a detachable hinge comprising parts 10 and 11. Part 10 is riveted to part 1 of the cover and has at its free end a hook 12. Part 11 of the hinge is riveted to part 2 of the cover and has at its free end a recess 13 adapted to receive and be engaged by the hook 12.

The opposite ends of parts 1 and 2 are held together by a catch or lock comprising member 15 riveted to part 2 of the cover and having bearings to support the trunnions 16, 16 of member 17. Member 17 has projecting therefrom a screw threaded bolt 18 adapted to engage a threaded aperture in the bifurcated member 20, whereby to allow for a given amount of adjustment of said member 20.

The free ends 21, 21 of member 20 have bearings formed therein for the reception of trunnions 22, 22 of the pivoted handle 25. A cylindrical shaped member 26 is formed integral with the free end of handle 25 and is adapted to rest under the overhanging surface of an upwardly projecting nub 27 that is made integral with plate 28, whereby to lock the parts 1 and 2 of the cover in closed position at one of the two locations for thus attaching said parts. Plate 28 is bolted or riveted to the exterior surface of part 1. Any spring lock 30 of well known construction is disposed in plate 28 and is adapted to engage and automatically lock in closed position, the stud 31 projecting from the under surface of handle 25, whereby to secure the cover from detachment by unauthorized persons.

The cover is assembled to a tire by hooking the parts 10 and 11 together at one end of the cover and then connecting the opposite or upper ends of parts 1 and 2 by engaging the member 26 of handle 25 beneath nub 27 and pushing handle 25 down adjacent the exterior surface of part 1, in which position it will be spring locked and remain until again unlocked and raised manually for the purpose of detaching parts 1 and 2 to remove the tire therewithin.

The free edges of parts 1 and 2 are formed with beads 32 thereat, whereby to avoid sharp edges at that location.

Having thus described my invention what I claim as new and desire to secure by Letters Patent is:

1. In a cover for a tire, semicircular members for enclosing said tire, a member having a recess formed on one of said semicircular members, another member having a hook formed on the other one of said semicircular members, whereby said semicircular members will demountably engage each other to enclose a tire, and pieces of felt having V-shaped grooves disposed at intervals within said semicircular members, whereby to form an air space to prevent the rotting of the tire.

2. In a cover for a tire, semicircular shaped members for enclosing a tire, one of said members having a recess and the other a hook, whereby said members will engage each other in a demountable manner, pieces of felt disposed within said semicircular shaped members, whereby to form an air space to prevent the rotting of the rubber tire, and metal casings for holding said pieces of fabric in place.

In testimony whereof I have affixed my signature.

FREDERICK R. GOEHNER.